May 19, 1964  B. T. HENSGEN ETAL  3,133,571
APPARATUS FOR PREPARING EQUAL WEIGHT SLICES OF PRODUCT
Filed April 4, 1957  3 Sheets-Sheet 1
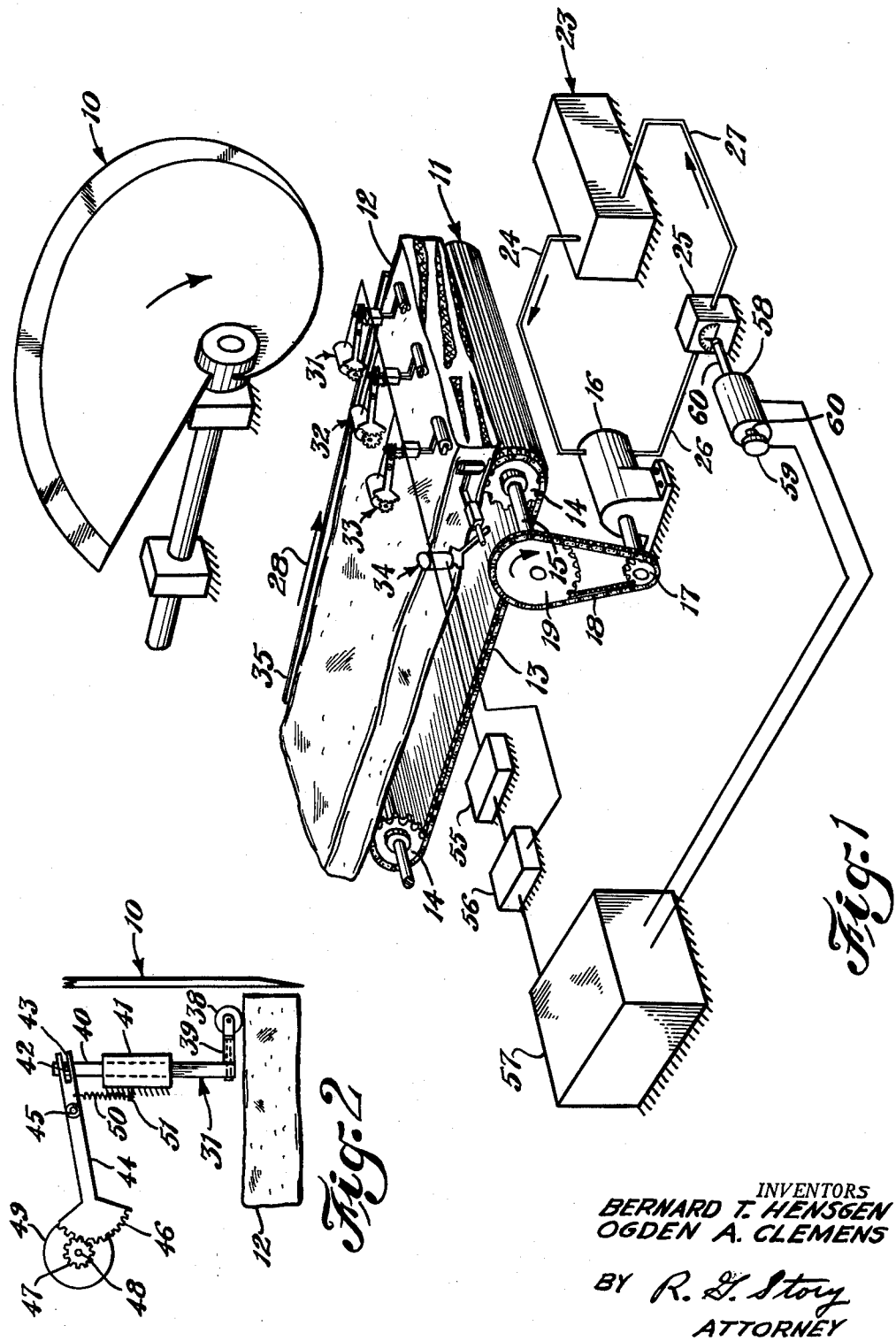
INVENTORS
BERNARD T. HENSGEN
OGDEN A. CLEMENS
BY R. G. Story
ATTORNEY INVENTORS
BERNARD T. HENSGEN
OGDEN A. CLEMENS
BY R. G. Stoy
ATTORNEY

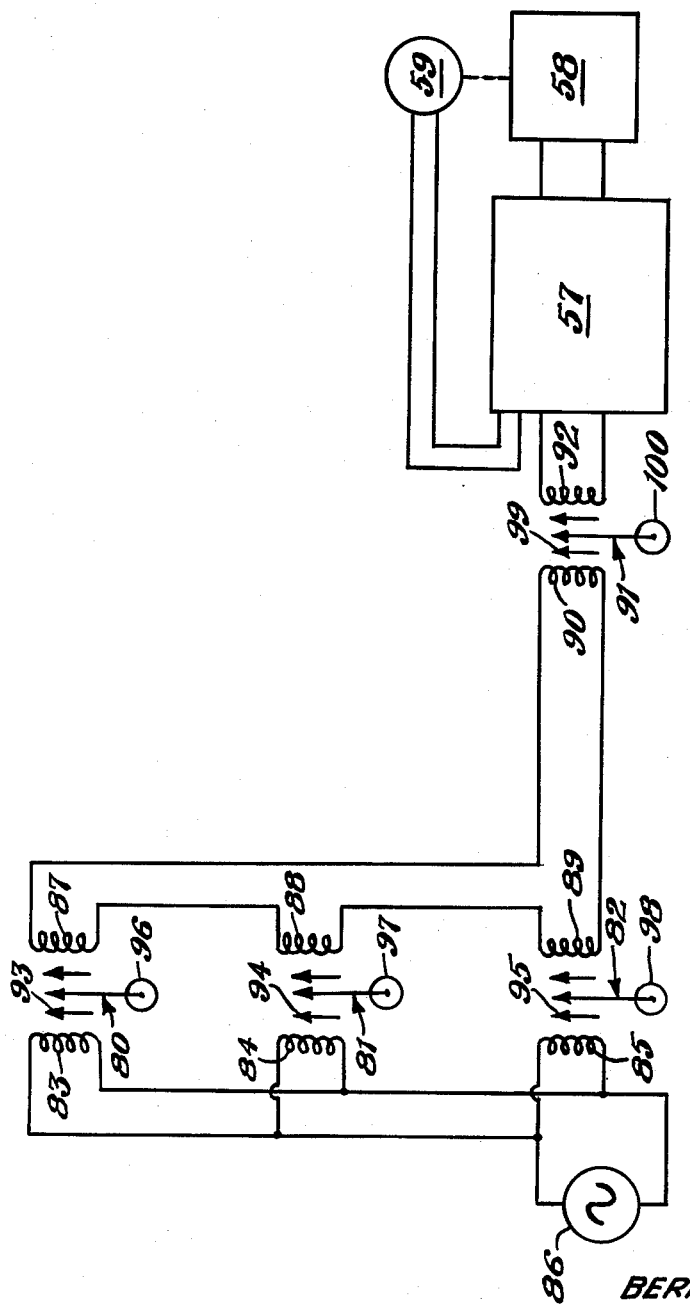

United States Patent Office 3,133,571
Patented May 19, 1964

3,133,571
APPARATUS FOR PREPARING EQUAL
WEIGHT SLICES OF PRODUCT
Bernard T. Hensgen and Ogden A. Clemens, Chicago, Ill., assignors to Swift & Company, Chicago, Ill., a corporation of Illinois
Filed Apr. 4, 1957, Ser. No. 650,652
12 Claims. (Cl. 146—95)

The present invention relates to an improved apparatus for preparing substantially equal weight groups of one or more slices of food products such as meat.

One of the important problems in the meat industry is the production of packages of product of a predetermined weight. While to one not familiar with the industry it might appear that attempting to maintain a tolerance of half an ounce or so on a pound would not be difficult or expensive, there are important problems in costs involved in even the maintaining of a tolerance of this small amount. In the first place, the tolerance must be on the high side, that is it cannot be plus or minus, because it is generally believed that if a package is indicated as being a pound in weight it must weigh at least that. Therefore, to the extent that a tolerance is employed it means that the meat packer is giving away product. When viewed in the light of the enormous number of pounds sold by a meat packer every year, this becomes a very important factor. For example, if a packer sells a million pounds of sliced bacon a year (in the year 1956 the total output of sliced bacon by packers subject to meat inspection by the Federal Government was in excess of one billion pounds), and if he averages a give-away of ¼ ounce on every pound he sells, he is giving away 15,625 pounds of bacon a year. If the bacon were selling for 50¢ a pound, this would be $7,812.50. Put another way, the packer is giving away approximately 1½% as much meat as he sells. This is a greater percentage than the percentage of net profit that many packers generally make on each dollar of sales. The foregoing illustrates the desirabiliy of reducing to an absolute minimum the difference in weight between the weight specified on a package, such as a package of bacon, and the weight of the meat actually contained within that package.

The present solution followed by most meat packers is to have employes weigh groups of slices of bacon and add or substract slices or portions thereof to endeavor to produce about a pound of bacon. This procedure has numerous disadvantages. In the first place, hand labor is expensive. Secondly, even with a substantial amount of supervision the employes will get careless and thereby give away an excessive amount of product or get the packer into trouble by producing underweight packages. The use of partial slices is not received with favor by the customer. Of course, with other meat products where there is only one slice to a package the expedients of using partial slices becomes impossible.

Various proposals have been suggested in the past for solving this problem. For example, one proposal has been to measure the thickness of a slab of bacon and vary the thickness of the slice in accordance with the thickness of the slab. While this may be a step in the right direction, it has not proven to be a solution of the entire problem.

The principal object of the present invention is to provide an improved apparatus for producing slices of a constant volume, thereby achieving slices of substantially constant weight. With such a procedure the group of slices, whether it be only one slice or a substantial number, will always weigh substantially the same.

In accordance with the present invention measurements of the cross-sectional size of the slab from which the slices are to be cut are made immediately adjacent the cutting knife. To correct for variations in the cross-section dimensions, where the slab or block from which the slices are to be cut has a lengthy side or sides, measurements are made at spaced points along that lengthy side or sides and such measurements are averaged out before the multiplication is made with the measurement or measurements of the other dimension. After the cross-sectional area is determined, the rate of speed with which the block of meat moves with respect to the knife is adjusted in accordance with the determined cross-sectional area so that the thickness of the slice to be cut is adjusted to obtain a constant volume.

Basically, the apparatus includes slicer parts such as a constant speed movable cutter means, which may be in the form of a rotary blade, and a feeder or pusher means for advancing the slab toward the cutter means, which may be in the form of a hydraulic powered device. Additionally, the present apparatus includes elements for controlling the rate at which the feeder means advances a slab in accordance with the cross-sectional dimension of the latter, including power means and control means for the feeder means, which may be in the form of hydraulic pumps and valves or the like; and both vertically and laterally sensing means or measuring means located to engage two adjacent sides, such as lateral and vertical surfaces, of the slab and connected through compensating means to the control means to thereby regulate the rate of advancement of the slab to provide substantially equal volume and weight slices.

It will be understood that one or more of each sensing or measuring means may be employed to obtain greater precision of measurement and that such means may engage the slab either directly or through any suitable follower device such as fingers and arms and the like. Furthermore, it is preferred that both the sensing means and compensating means be electrical; and an embodiment of the preferred apparatus is illustrated in the drawings, wherein:

FIGURE 1 is a diagrammatic representation of an apparatus of the present invention;

FIGURE 2 is a side view of a structure for measuring a dimension of the block and for converting that measurement into an electrical signal;

FIGURE 4 is a schematic illustration of an alternative form of measurement and control apparatus.

Figure 3:
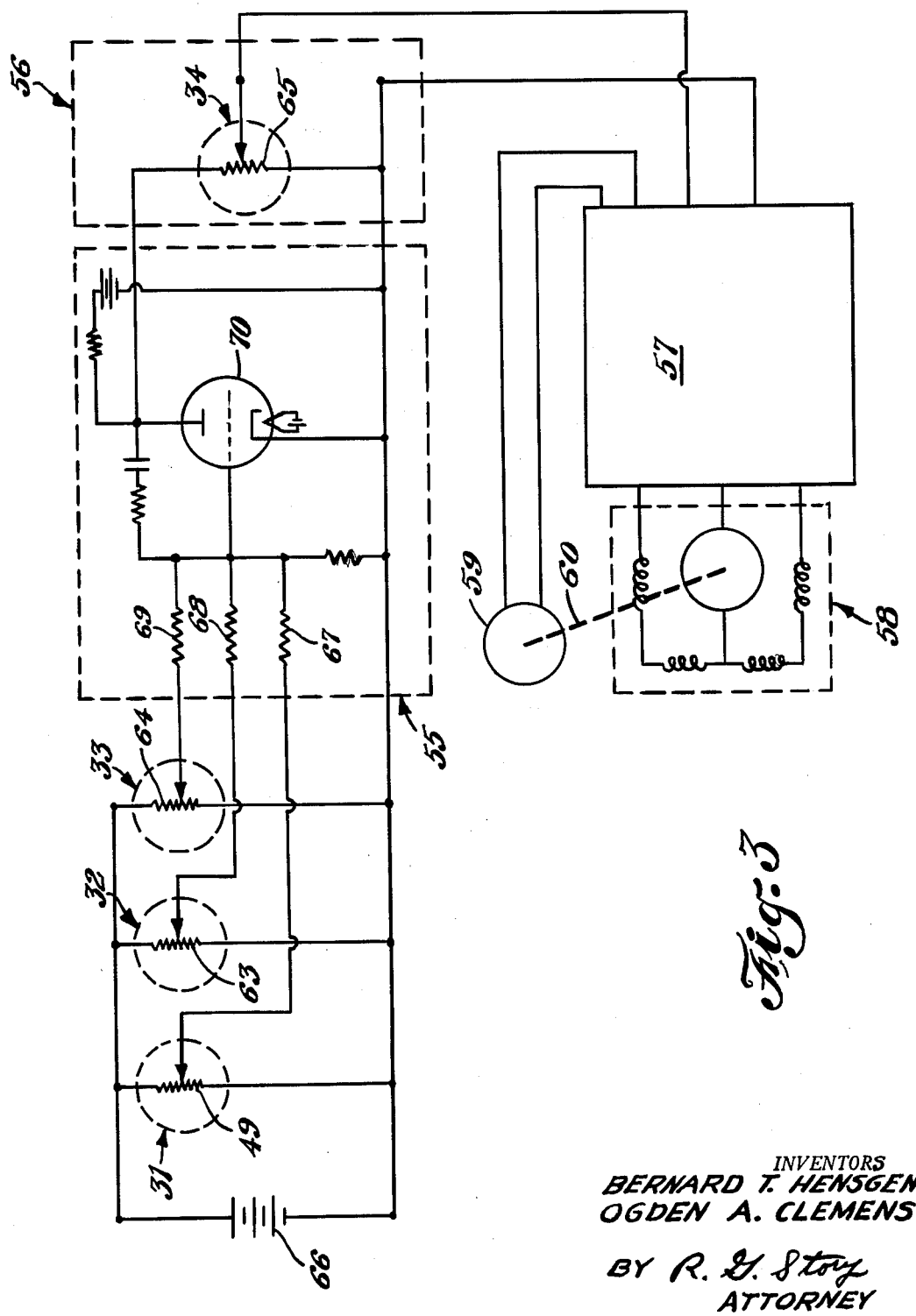
FIGURE 3 is a schematic wiring diagram illustrating the multiplication of the measurements in order to determine the cross-sectional area.

Slicing machines are so well-known in the art, for example see United States Patents Nos. 2,744,553 and 2,691,398, that the machine has been illustrated only diagrammatically in FIGURE 1. Essentially such a machine comprises a power driven rotary knife generally 10 and a conveyor generally 11 for moving the block of product 12 to the knife 10. Usually the speed of rotation of knife 10 is maintained constant so that the rate at which the block 12 is moved towards the knife determines the thickness of the slices cut by each rotation of the knife.

Many well-known forms of conveyor 11 might be employed. For the purpose of illustration the conveyor 11 comprises a belt 13 mounted on sprockets 14. A shaft 15 supporting one of the groups of sprockets 14 is driven from a motor 16 through a sprocket 17 on the output shaft of motor 16, a chain 18, and a sprocket 19 attached to shaft 15.

In the illustrated embodiment motor 16 is a hydraulic motor, as for example a motor produced by Denison Engineering Co. and identified as model TMB–11B. Hydraulic fluid to operate the motor is provided by a hydraulic pump unit generally 23. The hydraulic fluid under pressure from the pump is fed through a pipe 24 to motor 16 and a pipe 26 to a control valve 25. After passing through control valve 25 the hydraulic fluid returns through a pipe 27 to a reservoir which is a part of hydraulic pump unit 23. Motor 16 rotates in a direction to move block 12 in the direction indicated by arrow 28.

In the illustrated embodiment the block 12 represents a slab of bacon wherein there is a substantial width to the block with a relatively narrow thickness. Because that thickness will vary over the width of the block, a plurality of thickness-measuring units are employed. In the illustreated embodiment three thickness-measuring units, generally 31, 32 and 33, are employed. Inasmuch as the depth of the block 12 is rather small, only one width-sensing unit generally 34 is employed. Width-sensing unit 34 measures the width of the slab between a fence 35 against which the side of the block 12 opposite the width-sensing unit 34 is pressed. The sensing units 31–33 measure the thickness between the top of belt 13 and the sensing units.

Referring to FIGURE 2, the structure of the sensing unit 31 is illustrated. The structure of the other sensing units corresponds thereto. Sensing unit 31 comprises a roll 38 that rides on the upper surface of block 12. Roll 38 is rotatably mounted on one portion 39 of an L-shaped member, the other portion 40 of which is mounted for vertical movement in a bearing 41. A pin 42 projects from the upper end of portion 40 and is received in a slot 43 in a member 44 pivotally mounted on a pin 45. Both pin 45 and bearing 41 are fixedly attached to the frame (not shown) of the machine. The end of member 44 opposite slot 43 carries a gear segment 46 which engages a gear 47 on the operating shaft 48 of a rotary potentiometer 49. A spring 50 attached to member 44 and to a pin 51 urges member 44 in a clockwise direction about mounting pin 45 and holds sensing roll 38 in contact with the upper surface of the block 12.

The measurements of thickness determined by units 31, 32 and 33 are fed to an averaging unit 55 and the average thickness is then fed to a multiplying unit 56 to which is also fed the information as to the width of the block 12 as determined by width measuring unit 34. The multiplying unit then produces a signal which corresponds to the cross-sectional area, which information is delivered to a servo-amplifier 57. The servo-amplifier controls the operation of a servo-motor 58 which is connected to and positions valve 25 so as to move the block 12 at a rate of speed to produce slies from the block of a thickness such that the volume of the slice is constant. A feed back potentiometer 59 is coupled to servo-motor 58 to feed a signal back to servo-amplifier 57 to obtain a positioning of valve 25 in accordance with the requirements of the signal fed to the servo-amplifier by the multiplier 56.

Additional details of the electrical components are illustarted in FIGURE 3. As previously mentioned, the thickness determining unit 31 includes a potentiometer 49. Similarly, thickness sensing units 32 and 33 include potentiometers 63 and 64, respectively. Width-sensing unit 34 includes a potentiometer 65. A constant voltage, which for the purposes of illustration may be represented by battery 66, is fed to each of the three thickness potentiometers 49, 63 and 64. The slider of each of these potentiometers is connected through a resistor (numbers 67–69) to the grid of a vacuum tube 70 of averaging amplifier 55. This amplifier has a feed back between the plate of tube 70 and the grid thereof such that the signal at the plate of the tube is an average of the three voltages impressed on the grid thereon.

The signal from the plate of tube 70 is impressed across potentiometer 65 of the width-sensing unit 34. The signal from the sliding contact of potentiometer 65 will be the product of the multiplication of the input signal, i.e. the average of the three voltages of potentiometers 49, 63 and 64, times the position of the slider of potentiometer 65. Since the position of the slider of potentiometer 65 is determined by the width of the block 12, this product is the average thickness times the width. It will be seen that with such a hook-up the potentiometer 65 not only acts in the function of determining the width of the block 12 but also acts as the multiplying unit 56. Obviously these two functions could be separated and separate units employed for each separate function. This product of the average thickness times the width is fed to the servo-amplifier 57 which drives the servo-motor 58. Such amplifiers and motors are well-known in the art and detailed description of them is superfluous. An amplifier and motor similar to that described on page 143 of the book Handbook of Industrial Electronic Circuits, Markus & Zeluff, published by McGraw-Hill Book Company in 1948 would be suitable. As previously mentioned, feed back potentiometer 59 is coupled to the shaft 60 of the servo-motor 58 to feed a signal back to the servo-amplifier 57, which signal corresponds ot the angular position of shaft 60. Thus, when shaft 60 is set for the proper angular position corresponding to the signal fed to the servo-amplifier 57, the servo-motor 58 is not energized. Otherwise the servo-motor 58 is energized to turn shaft 60 in a direction to correct for the signal being fed to the servo-amplifier 57.

In the embodiment of FIGURE 4, the measurements are made by means of differential transformers. The details of such transformers are illustrated and described in U.S. Patents Nos. 2,568,587, 2,568,588, and 2,050,629. As in the previous embodiment, three measurments are made of the thickness of the slab of bacon at spaced points across the width of the slab. For this purpose three differential transformers, generally 80, 81 and 82, are employed. The primary windings 83, 84 and 85 of of the three transformers are connected in parallel and connected to a constant voltage alternator 86. Alternator 86 might be either of a mechanical or an electronic construction. The secondaries 87, 88 and 89 are connected in series and connected to the primary 90 of the width-measuring differential transformer generally 91. The secondary 92 of transformer 91 is connected to a servo-amplifier such as amplifier 57.

The variable cores 93, 94 and 95 of transformers 80–82, respectively, have feelers thereon represented by wheels 96, 97 and 98, respectively, which contact the upper surface of the slab and position the cores 93–95 in a position with respect to the windings of the transformers corresponding to the relative thickness of the slab at the point of contact of the feelers with the slab. Similarly transformer 91 has a variable core 99 having a feeler represented by wheel 100 to contact the side of the slab and measure the width of the slab. As the cores of the transformers move farther between the primary and secondary coils, a greater voltage is induced in the secondary. As the core moves out from between the windings a smaller voltage is induced in the secondary. The voltages in transformers 80–82 are added so that the total is a figure which corresponds to the sum of the thicknesses at the three points. Theoretically speaking, this amount should be divided by three before multiplying by the width. However, from a practical point of view dividing by three would merely give a new voltage ⅓ as large as the summation voltage and just more difficult to work with because of its smaller amount. Practically, in a specific piece of apparatus, the summation voltage is multiplied directly by the width. This is done by introducing the summation voltage into the primary of the width transformer 91 and moving the core 99 of that transformer corresponding to the width of the slab. The voltage then produced by the secondary of the width transformer 91 is a voltage which corresponds to the primary voltage times the width, or is a voltage which corresponds to the area of the slab. This voltage is then employed to operate the servo 58 in the manner previously described so as to adjust the speed of movement of the slab whereby the cubic volume of a slice cut from the portion of the slab where measurements were made will be constant.

In the control apparatus illustrated and described there will be some delay in adjusting the speed of movement of the slab. This delay is utilized and the feelers which take the measurement of the cross-sectional area of the slab are positioned at a point rearwardly of the plane at which the cutting occurs, a distance such that by the time the delay in the measurement and control apparatus occurs the portion of the slab that was measured has now moved up to the cutting plane. If the delay in the measurement and control apparatus is not sufficient for this purpose, additional delay may be introduced in the manner well-known in the art. It is particularly easy to introduce additional delay in the electronic portion of the circuitry by the use of electronic delay circuits.

The foregoing detailed description is only for clearness of understanding and for the purpose of complying with 35 U.S.C. 112, and we do not desire to be limited to the exact details of construction shown and described for obvious modifications will occur to a person skilled in the art.

We claim:

1. Apparatus for producing slices of food from a block of said food, including planar cutting means, feed means to support said block and to move it along a predetermined path in a given direction towards said cutting means whereby said cutting means will make cuts along a plane having a predetermined orientation with respect to said block, a plurality of electrical measuring means positioned in a second plane intersecting said path rearward of said cutting means with respect to said given direction, at least one of said plurality of measuring means being positioned to measure a dimension in said second plane substantially normal to the dimension measured by the other of said plurality of measuring means, said plurality of measuring means being electrically connected to successively measure the cross-sectional area of portions of said block along said second plane, and electrical control means operatively connecting said measuring means and said feed means to control the rate of movement of said block as each portion reaches said first plane as a function of the cross-sectional area of said portion.

2. An apparatus for producing slices of food from a block of said food, including a continuously rotating knife, a conveyor to support said block and to move said block along a predetermined path in a given direction towards said rotating knife, a plurality of electrical measuring means positioned at a point rearwardly of said knife with respect to said direction, at least one of said plurality of measuring means being positioned to measure, at said point, a dimension substantially normal to the dimension measured, at said point, by the other of said plurality of measuring means, said plurality of measuring means being electrically connected to measure the cross-sectional area of said block at said point, and electrical control means operatively connecting said measuring means and said conveyor to control the rate of movement of said block as each portion of said block reaches said knife as a function of the cross-sectional area of each said portion.

3. An apparatus for producing slices of food from a block of said food, including a continuously rotating knife, a conveyor to support said block and to move said block along a predetermined path in a given direction towards said rotating knife, measuring means at a plane intersecting said path rearwardly of said knife in said direction to measure a side dimension of the portion of said block at said plane, a second measuring means to measure the other side dimension of a portion of said block at said plane, means to multiply said two measurements to obtain a figure corresponding to the cross-sectional area of said portion of said block, said multiplying means being connected to said conveyor to control the rate of speed of movement of said block in said direction as said portion reaches said cutting means as a function of the figure of said portion.

4. An apparatus for producing slices of food from a block of said food, said apparatus including a rotary knife, a conveyor to move said block endwise toward said knife, a hydraulic motor operating said conveyor, hydraulic means connected to said motor to actuate said motor, said hydraulic means including a control valve, measuring means at a plane intersecting said path rearwardly of said knife in said direction to measure a side dimension of the portion of said block at said plane, a second measuring means to measure the other side dimension of a portion of said block at said plane, means to multiply said two measurements to obtain a figure corresponding to the cross-sectional area of said portion of said block, electrical control means including an electrical motor connected to said valve and said multiplying means to position said valve as a function of said figure whereby the speed of movement of the block on said conveyor is controlled as a function of the said figure.

5. Apparatus for producing slices of food from a block of said food, said apparatus including a knife, a conveyor to move said block endwise toward said knife, measuring means at a plane intersecting said path rearwardly of said knife, said measuring means being constructed and arranged to measure the dimensions of a portion of said block parallel to a side of said block at a plurality of points along the adjacent side of said portion of said block, means connected to said measuring means to average said measurements at said plurality of points, a second measuring means to measure the adjacent side of said portion of block, means connected to said second measuring means and to said averaging means to multiply said average with the measurement of said adjacent side to obtain a figure corresponding to the cross-sectional area of said portion of said block, electrical control means connected to said conveyor and to said multiplying means to move said block when said portion thereof reaches said conveyor at a speed which is a function of said figure.

6. An apparatus for producing slices of food from a block of said food, including a continuously rotating knife, a conveyor to support said block and to move said block endwise along a predetermined path in a given direction toward said knife, a plurality of first variable voltage sources positioned at a point rearwardly of said knife with respect to said direction and at a plane intersecting said path, each of said sources being constructed and arranged to measure the thickness of a portion of said block parallel to a side of said block along the adjacent side of said portion, a first electrical means connected to said sources to receive signals from said sources and to average the thickness measurements, a second variable voltage source constructed and arranged to measure the width of the adjacent side of said portion, a second electrical means connected to said first electrical means and to said second variable voltage source to receive signals therefrom and multiply said average thickness measurement and said width measurement to obtain a figure corresponding to the cross-sectional area of said portion of said block, electrical control means connected to said conveyor and to said second electrical means to move said block when said portion reaches said conveyor at a speed which is a function of said figure.

7. An apparatus for producing slices of food from a block of said food, said apparatus including a rotary knife, a conveyor to move said block endwise along a predetermined path in a given direction towards said knife, a hydraulic motor operating said conveyor, hydraulic means connected to said motor to activate said motor, said hydraulic means including a control valve, a plurality of first variable voltage sources positioned at a point rearwardly of said knife with respect to said direction and in a plane intersecting said path, each of said sources being constructed and arranged to measure the thickness of a portion of said block parallel to a side of said block along the adjacent side of said portion, a first electrical means connected to said sources to receive signals from said sources and to average the thickness measurements, a second variable voltage source constructed and arranged to measure the width of the adjacent side of said portion, a second electrical means connected to said first electrical means and to said second variable voltage source to receive signals therefrom and multiply said average thickness measurements and said width measurement to obtain a figure corresponding to the cross-sectional area of said portion of said block, electrical control means including an electrical motor connected to said valve and said second electrical means to position said valve as a function of said figure whereby the speed of movement of the block on said conveyor is controlled as a function of said figure.

8. A machine for slicing bacon or the like, including substantially constant speed movable cutter means, feeder means to advance bacon and the like toward said cutter means, vertically and laterally movable sensing means operatively associated with said feeder means to engage the advancing bacon and the like, power means operatively connected to said feeder means, control means connected to said power means, and compensating means interconnecting said vertical and lateral sensing means and operatively connected to said control means for advancing said bacon at speeds dependent upon the cross sectional area of a slab of bacon and the like to provide for the production of substantially uniform weight in a uniform number of slices of bacon and the like.

9. A machine for slicing bacon and the like as set forth in claim 8 wherein the sensing means includes at least one vertically movable finger engaging a lateral surface of the bacon and the like and a laterally movable arm engaging a generally vertical surface of the bacon and the like.

10. A machine for slicing bacon and the like as set forth in claim 8 wherein the power means is hydraulic and wherein the control means comprises a valve operable by the compensating means.

11. A machine for slicing bacon and the like as set forth in claim 10 wherein the sensing means includes at least one vertically movable finger engaging a lateral surface and a laterally movable arm engaging a generally vertical surface of the bacon and the like.

12. A machine for slicing bacon or the like as set forth in claim 8 wherein the sensing means and compensating means are electrical.

References Cited in the file of this patent

UNITED STATES PATENTS

| | | |
|---|---|---|
| 1,747,461 | Vaughan | Feb. 18, 1930 |
| 2,226,527 | Walter | Dec. 24, 1940 |
| 2,630,043 | Kolisch | Mar. 3, 1953 |
| 2,642,910 | Garapolo | June 23, 1953 |
| 2,708,368 | Kolisch | May 17, 1955 |
| 2,768,666 | Garapolo et al. | Oct. 30, 1956 |
| 2,832,352 | Powell | Apr. 29, 1958 |
| 2,858,614 | Schuenemann | Nov. 4, 1958 |

FOREIGN PATENTS

| | | |
|---|---|---|
| 861,665 | Germany | Jan. 5, 1953 |

OTHER REFERENCES

"Continuous Gaging" in March 1956 "Automation" magazine, pages 52 to 57.

"Bacon Giveaway on the Way Out," in Oct. 20, 1956, "National Provisioner" magazine, pages 32 to 37.